(12) United States Patent
Gallagher et al.

(10) Patent No.: US 6,948,739 B2
(45) Date of Patent: Sep. 27, 2005

(54) OPERATOR SUPPORT PAD FOR A VEHICLE

(75) Inventors: Michael P. Gallagher, Greenville, OH (US); Robert J. Henshaw, Newnan, GA (US)

(73) Assignee: Crown Equipment Corporation, New Bremen, OH (US)

( * ) Notice: Subject to any disclaimer, the term of this patent is extended or adjusted under 35 U.S.C. 154(b) by 114 days.

(21) Appl. No.: 10/624,769

(22) Filed: Jul. 22, 2003

(65) Prior Publication Data

US 2005/0016782 A1 Jan. 27, 2005

(51) Int. Cl.$^7$ ............................................. B60R 13/00
(52) U.S. Cl. ................. 280/770; 280/47.11; 280/43.12; 150/166
(58) Field of Search ............................. 280/32.7, 32.5, 280/43.12, 47.11, 784, 751, 752, 770; 150/157, 166; 50/159; 296/136.02, 136.07, 136.1; 180/19.1, 19.2, 19.3

(56) References Cited

U.S. PATENT DOCUMENTS

| | | | |
|---|---|---|---|
| 3,298,712 A | * | 1/1967 | Isidor .......................... 280/770 |
| 4,643,471 A | * | 2/1987 | Fishback ..................... 293/128 |
| 4,750,767 A | * | 6/1988 | Barnett ........................ 293/128 |
| 4,849,272 A | * | 7/1989 | Haney et al. ............... 428/102 |
| 4,974,892 A | * | 12/1990 | Huard ......................... 293/128 |
| 5,129,695 A | * | 7/1992 | Norman, II ................. 293/128 |
| RE34,194 E | * | 3/1993 | Stowell et al. ............. 16/111 R |
| 5,195,778 A | * | 3/1993 | Dismuke ..................... 280/770 |
| 5,245,144 A | | 9/1993 | Stammen |
| 5,511,822 A | * | 4/1996 | Wolanski ..................... 280/770 |
| 5,664,825 A | * | 9/1997 | Henke et al. ........... 296/136.02 |
| 5,799,975 A | * | 9/1998 | Crick .......................... 280/770 |
| 5,945,194 A | * | 8/1999 | Pester ......................... 428/120 |
| 6,062,601 A | * | 5/2000 | Willie et al. ................ 280/770 |
| 6,113,142 A | * | 9/2000 | Tolbert ....................... 280/770 |
| 6,273,626 B1 | * | 8/2001 | Yazawa ......................... 401/6 |
| 6,464,025 B1 | | 10/2002 | Koeper et al. |
| 6,595,306 B2 | * | 7/2003 | Trego et al. ............... 180/19.2 |
| D492,833 S | * | 7/2004 | Henshaw et al. ............ D34/28 |

OTHER PUBLICATIONS

Crown advertisement brochure No. SF12163 Rev. Jun. 1998 entitled Crown 3000 Series PE.
Crown specification brochure No. SF12155 Rev. Oct. 1999 entitled Crown PE 3000 Series end control pallet truck.

* cited by examiner

Primary Examiner—Christopher P. Ellis
Assistant Examiner—Jeff Restifo
(74) Attorney, Agent, or Firm—Stevens & Showalter LLP

(57) ABSTRACT

A pallet truck has a power unit including a main casing for housing drive apparatus and a platform onto which an operator may step and ride while controlling the truck. The casing includes at least one substantially rigid wall member and an operator support pad associated with the wall member. The support pad includes a main body having first and second ribbed portions with the first portion defining a deformable pocket.

23 Claims, 4 Drawing Sheets

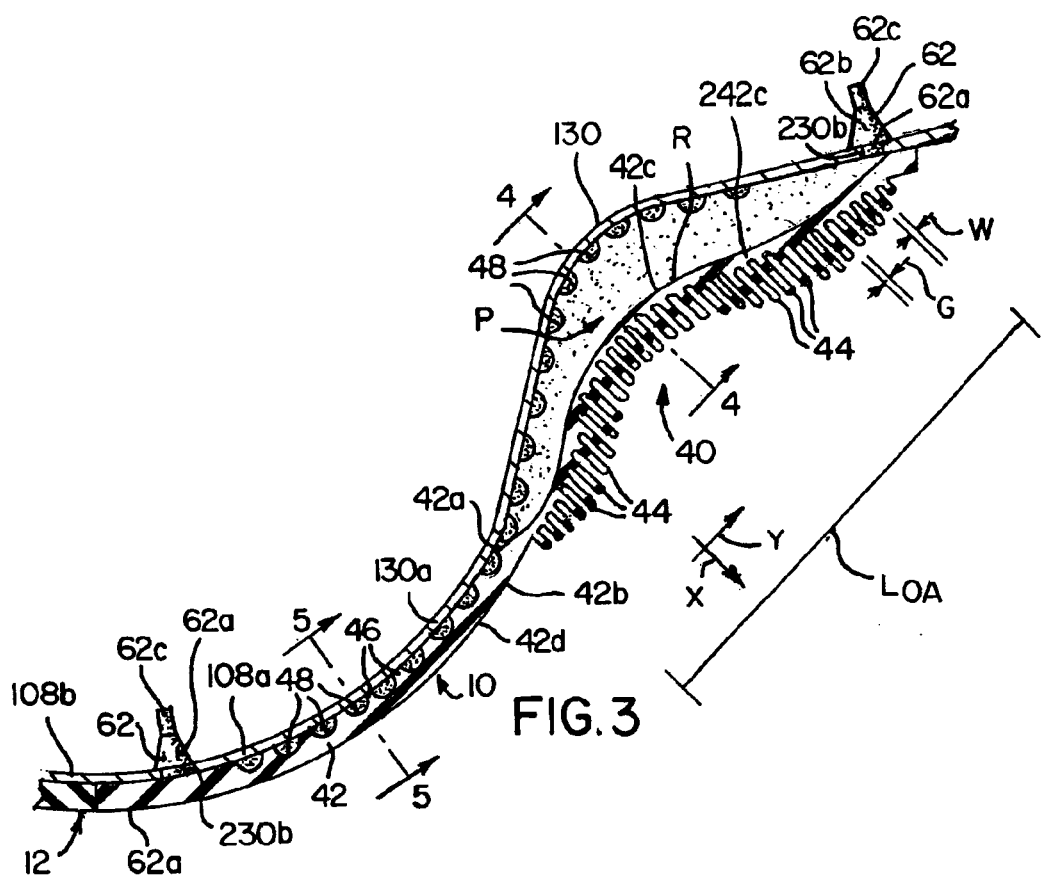
FIG. 3
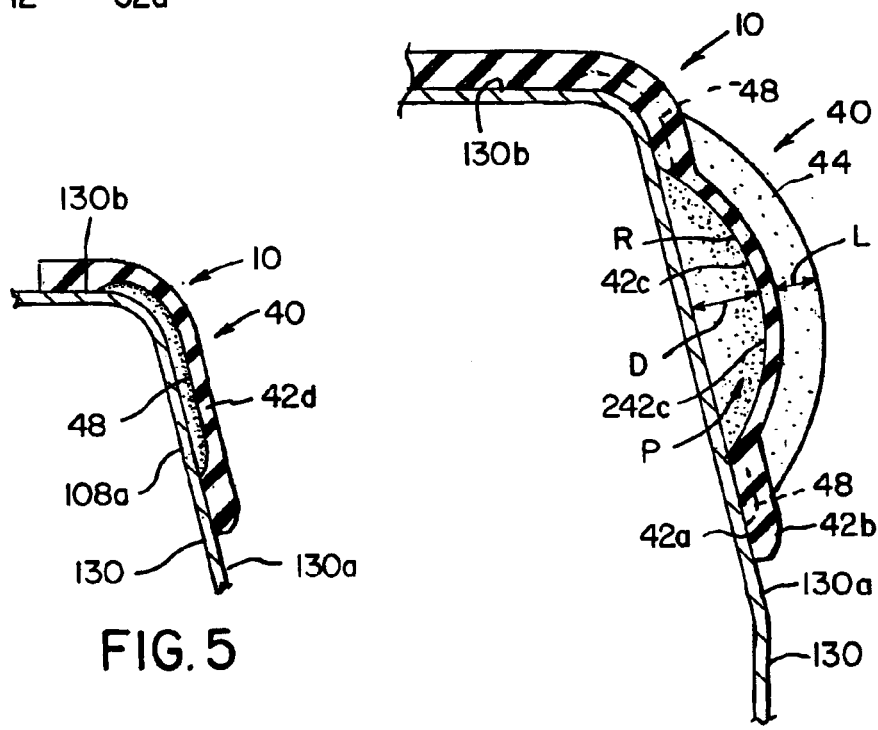
FIG. 5
FIG. 4

OPERATOR SUPPORT PAD FOR A VEHICLE

BACKGROUND OF THE INVENTION

The present invention relates to an operator support pad for a vehicle and, more particularly, to an operator support pad for use on a power unit of a rider pallet truck.

Walkie/rider pallet trucks are known in the prior art, see U.S. Pat. Nos. 6,464,025 and 5,245,144, the disclosures of which are incorporated herein by reference. Such a truck comprises a power unit, a steering control unit and load carrying forks. The power unit comprises a metal casing containing a traction motor. The power unit may also comprise an electric storage battery. Surrounding a portion of the power unit casing is a platform onto which an operator may step and ride while controlling the truck. A wraparound knee pad, illustrated in FIG. 1 of the '025 patent, is provided on the power unit casing for providing a surface against which an operator may rest his/her knee during travel. The knee pad comprises a molded foam polyurethane pad having a substantially planar outer skin. It was found that the outer skin on such a kneepad would crack and tear over time allowing foam material beneath it to break away from the remaining portion of the pad. Hence, this prior art pad degraded in an unacceptable manner over time.

Accordingly, there is a need for a more durable operator support pad for a vehicle, such as a rider pallet truck.

SUMMARY OF THE INVENTION

This need is met by the present invention, wherein an operator support pad is provided comprising a main body having a configuration which functions to provide cushioning for an operator as the operator leans against the support pad during operation of the vehicle. In the illustrated embodiment, the main body is formed from a non-foamed polymeric material, such as styrene butadiene rubber.

In accordance with a first aspect of the present invention, a pallet truck is provided comprising a power unit; a steering unit coupled to the power unit; and a set of forks coupled to the power unit. The power unit includes a main casing for housing drive apparatus and a platform onto which an operator may step and ride while controlling the truck. The casing includes at least one substantially rigid wall member and an operator support pad associated with the wall member. The support pad comprises a main body including ribs.

The support pad main body may comprise inner and outer surfaces. The inner surface is positioned adjacent the casing rigid wall member and the outer surface is visible by the operator. The ribs comprise a set of flexible first ribs formed in at least a first portion of the pad main body. The first ribs are capable of flexing to absorb and attenuate forces received from an operator's body contacting the operator support pad.

The first ribs may extend outwardly from the pad main body outer surface.

Preferably, the ribs further comprise a set of second ribs formed in at least a second portion of the pad main body. The first portion of the pad main body is substantially separate from the second portion of the pad main body.

The pad main body second portion comprises a plurality of recesses. The second ribs are defined between those recesses. The second ribs and the recesses are adapted to absorb and attenuate forces received by the second portion of the pad main body from the operator's body.

The first portion of the pad main body is spaced a distance away from the wall member when a force is not being applied to the pad main body first portion such that a pocket is defined behind the first portion. The main body first portion is capable of deforming inwardly toward the wall member when a force is applied thereto.

The pad main body second portion substantially surrounds at least a part of the first portion. At least one of the recesses formed in the main body second portion extends into the main body first portion for communicating with the pocket so as to allow air to move into and out of the pocket as forces are applied to and removed from the pad main body first portion.

Preferably, the support pad is formed from a polymeric material. The polymeric material may comprise a non-foamed material.

Preferably, the support pad is positioned so as to be at substantially the same level as a knee of the operator.

The operator support pad may be integrally incorporated into a polymeric material shroud covering at least a portion of the wall member.

The wall member may comprise substantially vertical and horizontal sections. The shroud preferably comprises an insulation member for preventing at least a portion of thermal and acoustic energy passing through the vertical and horizontal sections of the wall member from reaching the operator.

In accordance with a second aspect of the present invention, a pallet truck is provided comprising: a power unit; a steering unit coupled to the power unit; and a set of forks coupled to the power unit. The power unit may include a main casing for housing drive apparatus and a platform onto which an operator may step and ride while controlling the truck. The casing includes at least one substantially rigid wall member and a shroud covering at least a portion of the wall member. The shroud includes an operator support pad comprising a main body.

Preferably, the operator support pad is integrally incorporated into the shroud.

The operator support pad main body may comprise ribs.

The support pad main body comprises inner and outer surfaces. The inner surface is positioned adjacent the casing rigid wall member and the outer surface is visible by the operator. The ribs may comprise a set of flexible first ribs formed in at least a first portion of the pad main body. The first ribs are capable of flexing to absorb and attenuate forces received from an operator's body contacting the operator support pad. The first ribs may extend outwardly from the pad main body outer surface.

The ribs preferably further comprise a set of second ribs formed in at least a second portion of the pad main body.

The pad main body second portion comprises a plurality of recesses formed in the main body inner surface. The second ribs are defined between the recesses. The second ribs and the recesses are adapted to absorb and attenuate forces received by the second portion of the pad main body from the operator's body.

The first portion of the pad main body is spaced a distance away from the wall member when a force is not being applied to the pad main body first portion such that a pocket is defined behind the first portion. The main body first portion is capable of deforming inwardly toward the wall member when a force is applied thereto.

The pad main body second portion substantially surrounds at least a part of the first portion. At least one of the recesses formed in the main body second portion extends into the main body first portion for communicating with the pocket so as to allow air to move into and out of the pocket as forces are applied to and removed from the pad main body first portion.

In accordance with a third aspect of the present invention, a shroud is provided for covering at least a portion of a vehicle wall member. The shroud includes an operator support pad comprising a main body. The main body preferably comprises ribs.

The support pad main body comprises inner and outer surfaces. The inner surface is positioned adjacent the wall member and the outer surface is visible by the operator. The ribs comprise a set of flexible first ribs formed in at least a first portion of the pad main body. The first ribs are capable of flexing to absorb and attenuate forces received from an operator's body contacting the operator support pad.

The first ribs may extend outwardly from the pad main body outer surface.

The ribs may further comprise a set of second ribs formed in at least a second portion of the pad main body. The first portion of the pad main body is substantially separate from the second portion of the pad main body.

The pad main body second portion may comprise a plurality of recesses. The second ribs are defined between the recesses. The second ribs and the recesses are adapted to absorb and attenuate forces received by the second portion of the pad main body from the operator's body.

The first portion of the pad main body is spaced a distance away from the wall member when a force is not being applied to the pad main body first portion such that a pocket is defined behind the first portion. The main body first portion is capable of deforming inwardly toward the wall member when a force is applied thereto.

The pad main body second portion substantially surrounds at least a part of the first portion. At least one of the recesses formed in the main body second portion extends into the main body first portion for communicating with the pocket so as to allow air to move into and out of the pocket as forces are applied to and removed from the pad main body first portion.

The shroud is preferably formed from a non-foamed polymeric material.

BRIEF DESCRIPTION OF THE DRAWINGS

FIG. 3 is a view taken along view line 3—3 in FIG. 1;

FIG. 4 is a view taken along view line 4—4 in FIG. 3; and

FIG. 5 is a view taken along view line 5—5 in FIG. 3.

DETAILED DESCRIPTION OF THE INVENTION

Figure 1:
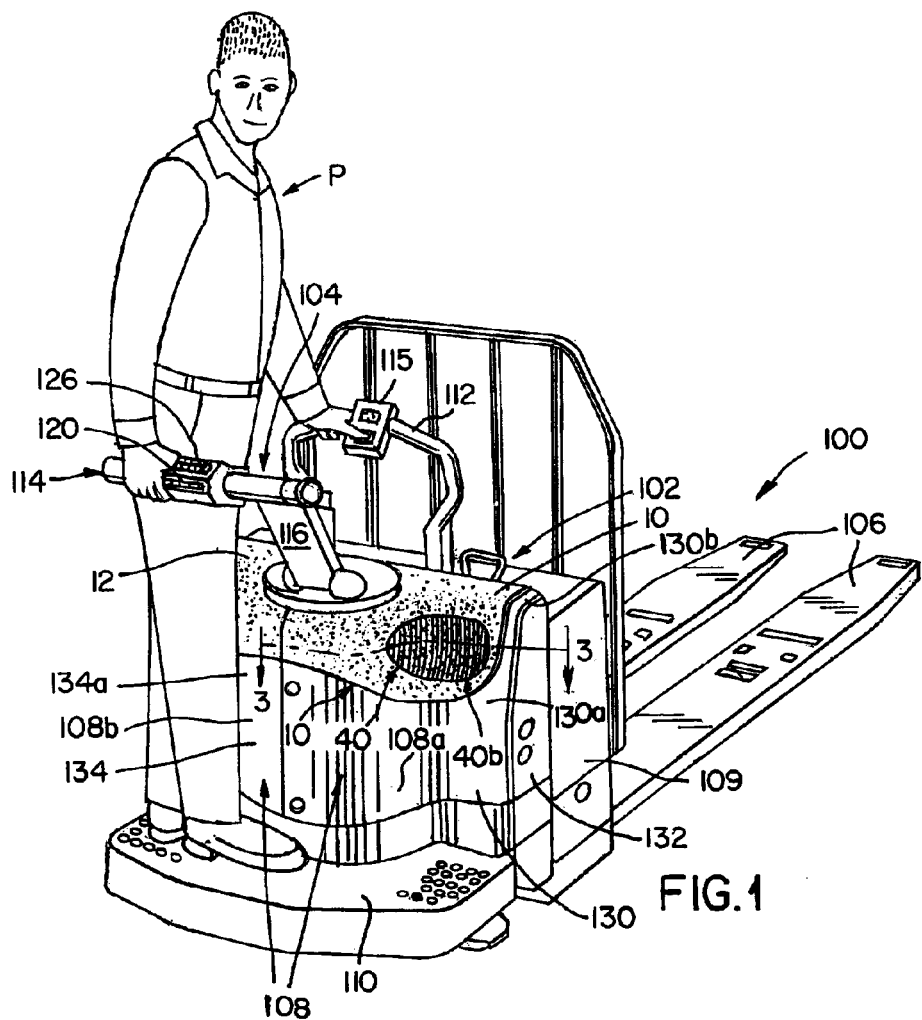
FIG. 1 is a perspective view of a pallet truck including first and second shrouds formed in accordance with the present invention.
Figure 1A:
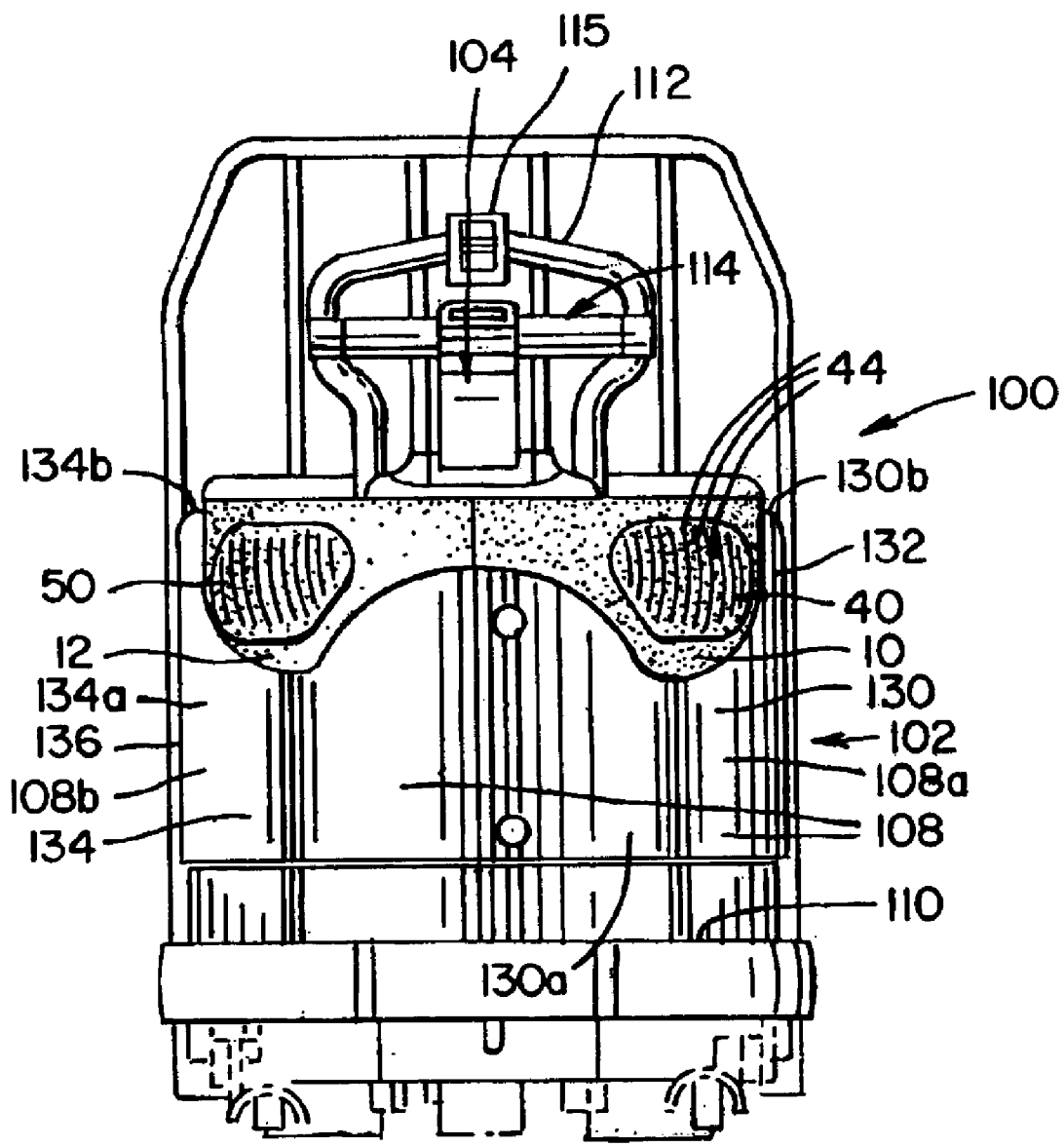
FIG. 1A is a rear view of the pallet truck of FIG. 1 illustrating the first and second shrouds provided on the truck.
Figure 1B:
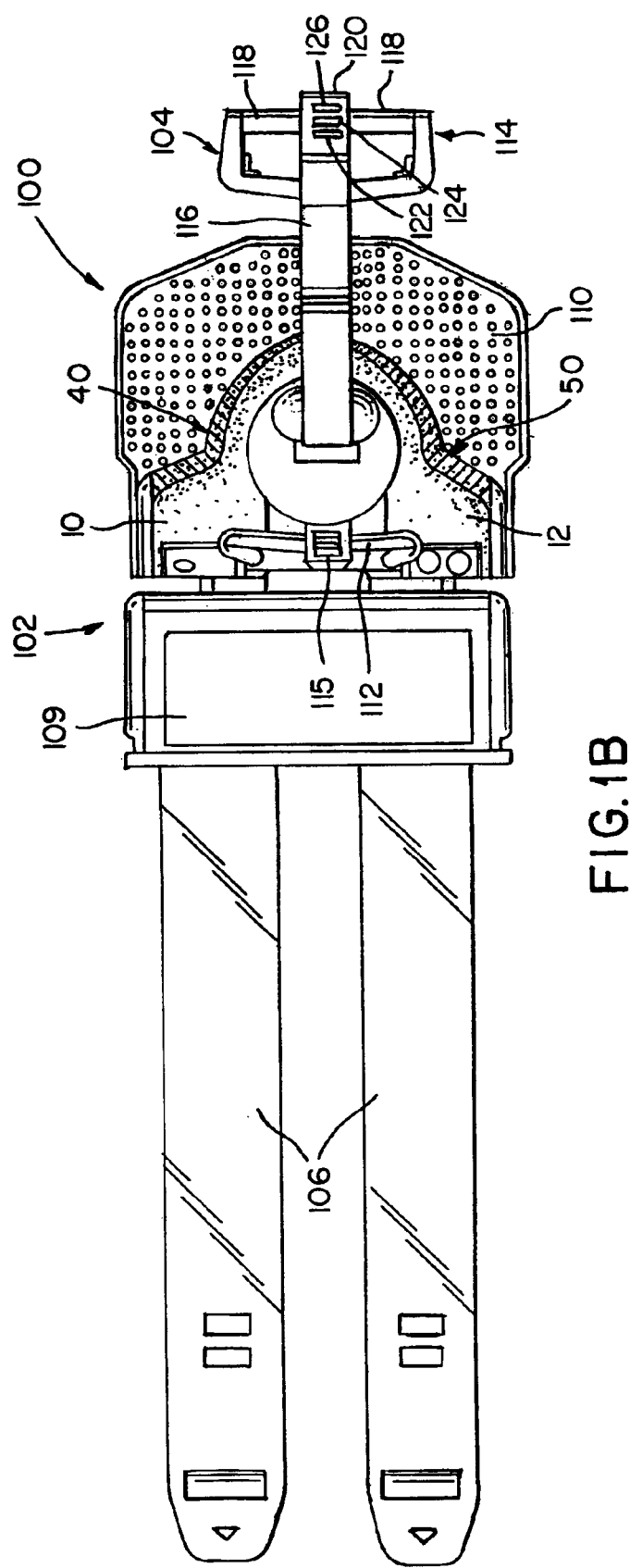
FIG. 1B is a plan view of the pallet truck of FIGS. 1 and 1A.

FIGS. 1, 1A and 1B illustrate a walkie/rider pallet truck 100 including first and second shrouds 10 and 12 formed in accordance with the present invention. As will be discussed further below, the shrouds 10, 12 function to insulate an operator P from thermal and acoustic energy generated by the truck 100. The shrouds 10, 12 further function to provide cushioning to an operator's knee as the operator P leans against one of the shrouds 10, 12 during vehicle operation.

The truck 100 includes a power unit 102, a steering control unit 104, and load carrying forks 106 that extend rearwardly from the power unit 102. The power unit 102 contains a steerable wheel (not shown), usually located directly beneath the steering control unit 104, a metal main casing 108 housing drive apparatus such as an electric traction motor (not shown), and an electric storage battery 109 mounted in front of the casing 108. The power unit 102 also includes a platform 110 onto which the operator P may step and ride while controlling the truck 100, see FIG. 1. A hand rail or grab bar 112 is provided for the operator P to grip while riding on the platform 110. A control panel 115 is mounted on the grab bar 112 and includes a high speed/coast release switch, a horn switch, a raise forks switch, a lower forks switch and a coast switch. These switches are discussed in detail in U.S. Pat. No. 6,464,025, which has previously been incorporated by reference herein.

The steering control unit 104 includes a handle 114 mounted at the distal end of a steering arm 116 that is pivotally mounted to the power unit 102. The operator uses the handle 114 to control steering, braking and other truck functions. To this end, the handle 114 includes operator controls, such as twist grips 118 for controlling the direction (forward and reverse) and speed of the truck 100, a reverser switch 120, switches 122 and 124 for raising and lowering the forks 106, respectively, and a horn switch 126, see FIG. 1B.

The steering arm 116 is moved from side to side to rotate the steering control unit 104 relative to the power unit 102 to determine the steered direction of the truck 100. The steering arm 116 is also used to apply a brake (not shown) to stop the steerable wheel. For braking the truck 100, the steering arm 116 is moved to either a generally horizontal (down) braking position or a generally vertical (up) braking position. For movement of the truck 100, the steering arm 116 is moved to a traveling, operating or driving position within a driving range or arc interposed between horizontal and vertical braking arcs, as discussed in the '025 patent.

As noted above, the power unit 102 comprises a metal main casing 108 housing drive apparatus (not shown). In particular, the main casing 108 comprises first and second pivotable doors 108a and 108b, see FIG. 1, which open to allow access to the drive apparatus. The first door 108a comprises a substantially rigid main wall member 130 and a substantially rigid side wall member 132. The main wall member 130 comprises substantially vertical and horizontal sections 130a and 130b, respectively. The second door 108b likewise comprises a substantially rigid main wall member 134 and a substantially rigid side wall member 136, see FIGS. 1 and 1A. The main wall member 134 comprises substantially vertical and horizontal sections 134a and 134b.

The first shroud 10 is mounted to the main wall member 130 of the first door 108a, while the second shroud 12 is mounted to the main wall member 134 of the second door 108b. The first and second shrouds 10, 12 function to insulate the operator P from portions of thermal and acoustic energy generated by the truck 100. In the illustrated embodiment, the shrouds 10, 12 are formed from a substantially solid polymeric material, such as a synthetic rubber. An example of synthetic rubber is styrene butadiene rubber. Other polymeric materials from which the shrouds 10, 12 may be formed include self-skinning polyurethane foam; injection-molded thermoplastic rubber; and rotationally molded vinyl with a foamed backing.

In the illustrated embodiment, the first shroud 10 includes an operator support pad 40 integrally formed therein, see all Figures. The second shroud 12 similarly comprises an integral operator support pad 50, see FIGS. 1A and 1B. Each support pad 40, 50 provides a surface against which an operator P may rest a knee during operation of the truck 100, see FIG. 1. The support pads 40, 50 are configured to absorb and attenuate forces generated by the truck 100, such as vibrations, so as to prevent those forces from reaching the operator P. The pads 40, 50 also function to absorb and attenuate forces generated by the operator P, such as during a braking operation of the truck 10, to prevent the operator P from receiving significant opposing forces from a corresponding main wall member 130, 134.

The second shroud 12 and its integral support pad 50 are formed and configured in substantially the same manner as the first shroud 10 and its integral support pad 40. Accordingly, only a description of the first shroud 10 and its support pad 40 will be specifically described herein.

Figure 2:
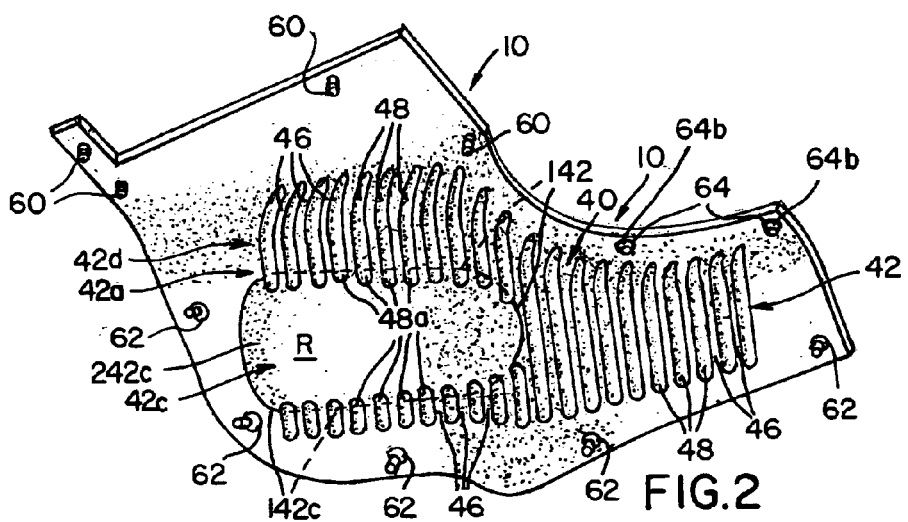
FIG. 2 is a perspective view of an inside surface of a shroud formed in accordance with the present invention.

The first shroud 10 includes first, second, third and fourth metal bolts 60 embedded therein such that the threaded portions extend outwardly from the shroud 10, see FIG. 2. The bolts 60 extend through corresponding openings (not shown) in the horizontal section 130b of the first door main wall member 130. Nuts (not shown) are mounted on the bolts for securing the shroud 10 to the wall member 130. Integral polymeric first and second connecting members 62 and 64, respectively, extend from the shroud 10 and are received in corresponding openings 230b provided in the first door main wall member 130 so as to further secure the shroud 10 to the wall member 130, see FIG. 3. The first connecting members 62 comprise a stem portion 62a, which has substantially the same diameter as that of corresponding openings 230b, an intermediate conical portion 62b, which is of a larger size than the stem portion 62a, and a distal end portion 62c having a reduced diameter, see FIG. 3. The second connecting members 64 comprise a stem portion (not shown), which has substantially the same diameter as that of corresponding openings 230b, and a conical portion 64b, which is of a larger size than the stem portion. The second connecting members 64 do not comprise an outer portion of reduced diameter.

The integral support pad 40 comprises a main body 42 having inner and outer surfaces 42a and 42b, respectively. The inner surface 42a is positioned adjacent the main wall member 130 and the outer surface 42b is visible by the operator P. The pad 40 comprises a set of flexible first ribs 44 formed in a first portion 42c of the pad main body 42. In the illustrated embodiment, the overall length $L_{OA}$ of the pad main body first portion 42c in a Y-direction, as illustrated in FIG. 3, is approximately 210 mm. The footprint of the main body first portion 42c is designated in FIG. 2 by the solid and phantom lines 142c. Further in the illustrated embodiment, the flexible ribs 44 have a length L in an X direction, see FIGS. 3 and 4, ranging from about 7.0 mm for the shortest ribs 44 to about 13.0 mm for the longest ribs 44. Each rib 44 also has a width W or thickness in a Y direction of 3.0 mm. A gap G of approximately 4.0 mm is defined between each pair of adjacent ribs 44. The first ribs 44 extend outwardly from the outer surface 42b of the support pad main body 42 so as to be visible to the operator P. Due to their shape and size, the flexible first ribs 44 are capable of flexing to absorb and attenuate forces received from an operator's body contacting the support pad first portion 42c. It is contemplated that the dimensions for overall length $L_{OA}$, rib length L, rib width W and gap G may be varied as desired by one skilled in the art.

A base section 242c of the main body first portion 42c is shaped to define a recess R in the inner surface 42a of the pad main body 42, see FIGS. 2–4. When the shroud 10 is mounted to the first door 108a, the first portion base section 242c is spaced away from the first door main wall member 130, e.g., a distance D at the section illustrated in FIG. 4, when a force is not being applied to the first portion 42c such that a pocket P is defined between the first portion 42c and the wall member 130. The main body first portion 42c is capable of deforming inwardly toward the wall member 130 when a force is applied thereto. Hence, the shaped first portion base section 242c of the pad main body 42 functions as a leaf spring to absorb and attenuate forces applied by the operator's knee against the main body first portion 42c. This spring-like mechanism inherent in the configuration or shape of the first portion base section 242c in conjunction with the flexible first ribs 44 provide two separate mechanisms for absorbing and attenuating forces delivered to the first portion 42c of the pad main body 42 by an operator's knee.

The integral support pad 40 further comprises a set of second ribs 46 formed in a second portion 42d of the support pad main body 42, see FIGS. 2 and 3. The second portion 42d further comprises a plurality of recesses 48 formed in the main body inner surface 42a. The second ribs 46 are defined between the recesses 48. The second ribs 46 and the recesses 48 function to absorb and attenuate forces received by the second portion 42d of the pad main body 42 from the operator's body.

The pad main body second portion 42d substantially surrounds the first portion 42c. End sections 48a of a portion of the recesses 48 extend into the main body first portion 42c for communicating with the pocket P so as to allow air to move into and out of the pocket P as forces are applied to and removed from the pad main body first portion 42c.

It is contemplated that the support pad 40 of the present invention may be used to provide cushioning for other portions of an operator's body. For example, a support pad comprising first and second ribs 44, 46 and recesses 48 may be incorporated into a mat positioned on the platform 110.

What is claimed is:

1. A pallet truck comprising:
   a power unit;
   a steering unit coupled to said power unit;
   a set of forks coupled to said power unit; and
   said power unit including a main casing for housing drive apparatus and a platform onto which an operator may step and ride while controlling the truck, said casing including at least one substantially rigid wall member and an operator support pad associated with said wall member, said support pad comprising a main body including a plurality of ribs which are flexible relative to a base section of said main body, said main body being adapted to be contacted by an operator's knee while the operator is controlling the truck.

2. A pallet truck as set forth in claim 1, wherein said support pad main body comprises inner and outer surfaces, said inner surface being positioned adjacent said casing rigid wall member and said outer surface being visible by said operator, said ribs comprising a set of flexible first ribs formed in at least a first portion of said pad main body, said first ribs being capable of flexing to absorb and attenuate forces received from an operator's body contacting said operator support pad.

3. A pallet truck as set forth in claim 2, wherein said first ribs extend outwardly from said pad main body outer surface.

4. A pallet truck as set forth in claim 3, wherein said main body further includes a set of second ribs formed in at least a second portion of said pad main body.

5. A pallet truck as set forth in claim 4, wherein said first portion of said pad main body is substantially separate from said second portion of said pad main body.

6. A pallet truck as set forth in claim 4, wherein said pad main body second portion comprises a plurality of recesses, said second ribs being defined between said recesses, said second ribs and said recesses being adapted to absorb and attenuate forces received by said second portion of said pad main body from said operator's body.

7. A pallet truck as set forth in claim 6, wherein said first portion of said pad main body is spaced a distance away from said wall member when a force is not being applied to said pad main body first portion such that a pocket is defined behind said first portion, and said main body first portion being capable of deforming inwardly toward said wall member when a force is applied thereto.

8. A pallet truck as set forth in claim 7, wherein said pad main body second portion substantially surrounds at least a part of said first portion, at least one of said recesses formed in said main body second portion extending into said main, body first portion for communicating with said pocket so as to allow air to move into and out of said pocket as forces we applied to and removed from said pad main body first portion.

9. A pallet truck as set forth in claim 4, wherein said first and second ribs are formed from a polymeric material.

10. A pallet truck as set forth in claim 9, wherein said polymeric material comprises a non-foamed material.

11. A pallet truck as set forth in claim 1, wherein said support pad is positioned so as to be at substantially the same level as a knee of the operator.

12. A pallet truck as set forth in claim 1, wherein said operator support pad is integrally incorporated into a polymeric material shroud covering at least a portion of said wall member.

13. A pallet truck as set forth in claim 12, wherein said wall member comprises substantially vertical and horizontal sections, and said shroud comprising an insulation member for preventing at least a portion of thermal and acoustic energy passing through the vertical and horizontal sections of said wall member from reaching the operator.

14. A pallet truck comprising:

a power unit;

a steering unit coupled to said power unit;

a set of forks coupled to said power unit; and said power unit including a main casing for housing drive apparatus and a platform onto which an operator may step and ride while controlling the truck, said casing including at least one substantially rigid wall member and a shroud covering at least a portion of said wall member, said shroud including an operator support pad comprising a main body having a plurality of ribs which are flexible relative to a base section of said main body, said main body being adapted to be contacted by an operator's knee while the operator is controlling the truck.

15. A pallet truck as set forth in claim 14, wherein said support pad is positioned so as to be at substantially the same level as a knee of an operator.

16. A pallet truck as set forth in claim 14, wherein said operator support pad is integrally incorporated into said shroud.

17. A pallet truck as set forth in claim 14, wherein said support pad main body comprises inner and outer surfaces, said inner surface being positioned adjacent said casing rigid wall member and said outer surface being visible by said operator, said ribs comprising a act of flexible first ribs formed in at least a first portion of said pad main body, said set of flexible ribs being capable of flexing to absorb and attenuate forces received from an operator's body contacting said operator support pad.

18. A pallet truck as set forth in claim 17, wherein said first ribs extend outwardly from said pad main body outer surface.

19. A pallet truck as set forth in claim 18, wherein said main body further includes a set of second ribs formed in at least a second portion of said pad main body.

20. A pallet truck as set forth in claim 19, wherein said first portion of said pad main body is substantially separate from said second portion of said pad main body.

21. A pallet truck as set fourth in claim 20, wherein said pad main body second portion comprises a plurality of recesses, said second ribs being defined between said recesses, said second ribs and said recesses being adapted to absorb and attenuate forces received by said second portion of said pad main body from said operator's body.

22. A pallet truck as set forth in claim 21, wherein said first portion of said pad main body is spaced a distance away from said wall member when a force is not being applied to said pad main body first portion such that a pocket is defined behind said first portion, and said main body first portion being capable of deforming inwardly toward said wall member when a force is applied thereto.

23. A pallet track as set forth in claim 22, wherein said pad main body second pardon substantially surrounds at least a part of said first portion, at least one of said recesses formed in said main body second portion extending into said main body first portion far communicating with said pocket so as to allow air to move into and out of said pocket as forces are applied to and removed from said pad main body first portion.

* * * * *

UNITED STATES PATENT AND TRADEMARK OFFICE
CERTIFICATE OF CORRECTION

PATENT NO. : 6,948,739 B2  Page 1 of 1
DATED : September 27, 2005
INVENTOR(S) : Michael P. Gallagher and Robert J. Henshaw It is certified that error appears in the above-identified patent and that said Letters Patent is hereby corrected as shown below:

<u>Column 5,</u>
Line 50, "42c in a Y-direction," should read -- 42c in a Y direction, --;

<u>Column 7,</u>
Line 23, "said main,body first portion" should read -- said main body first portion --;
Line 25, "forces we applied" should read -- forces are applied --;

<u>Column 8,</u>
Line 17, "comprising a act of flexible" should read -- comprising a set of flexible --;
Line 31, "as set fourth in claim" should read -- as set forth in claim --;
Lines 44-45, "main body second pardon" should read -- main body second portion --;
Line 45, "a pallet track" should read -- a pallet truck --;
Line 48, "body first portion far communicating" should read -- body first portion for communicating --.

Signed and Sealed this

Twenty-eighth Day of March, 2006

JON W. DUDAS
*Director of the United States Patent and Trademark Office*